(No Model.)
G. W. KNAPP.
METHOD OF MAKING WIRE HANDLES.
No. 371,463. Patented Oct. 11, 1887.
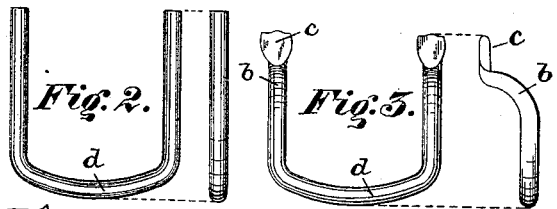
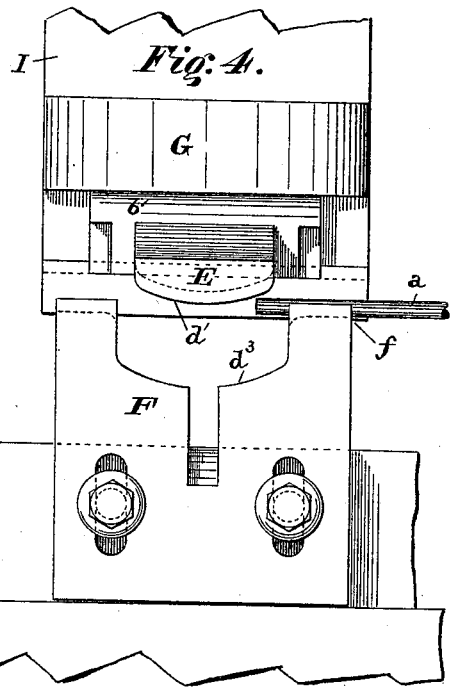
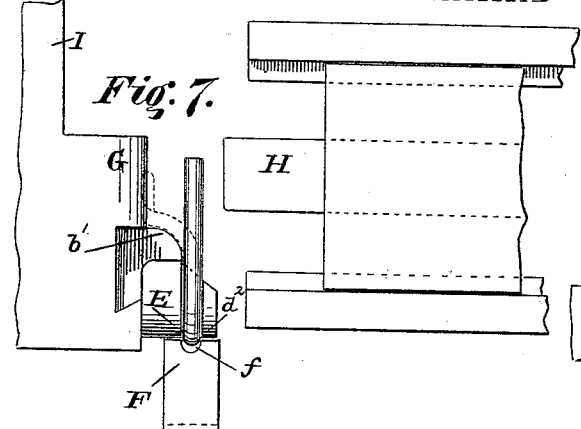
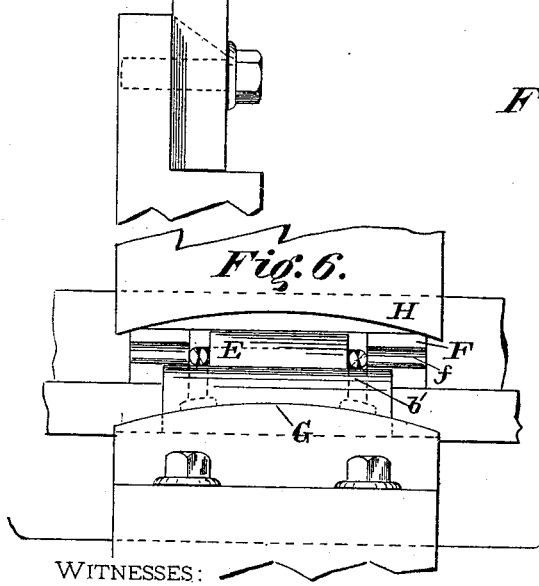
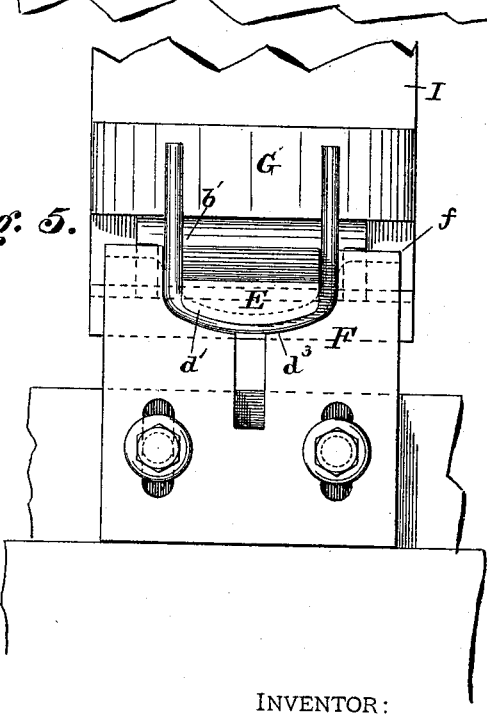
WITNESSES:
Edward A. Osse,
John E. Morris
INVENTOR:
Geo. W. Knapp
BY Chas B. Mann
ATTORNEY.

UNITED STATES PATENT OFFICE.

GEORGE W. KNAPP, OF BALTIMORE, MARYLAND, ASSIGNOR TO MATTHAI, INGRAM & CO., OF SAME PLACE.

METHOD OF MAKING WIRE HANDLES.

SPECIFICATION forming part of Letters Patent No. 371,463, dated October 11, 1887.

Application filed March 14, 1887. Serial No. 230,768. (No model.)

*To all whom it may concern:*

Be it known that I, GEORGE W. KNAPP, a citizen of the United States, residing at Baltimore, in the State of Maryland, have invented certain new and useful Improvements in the Method of Making Wire Handles, of which the following is a specification.

My invention relates to an improved method of making loop-shaped wire handles to be used for dish-pans, colanders, saucepans, and the like. Handles of the kind referred to are made of heavy wire, and, besides being bent to the desired loop shape, must have their ends flattened and curved and twisted, ready for attachment to the vessel. Heretofore in making these handles the wire has been subjected to heat, and the operation has been as follows: A piece of heavy wire of proper length for a handle is first bent approximately U shape. It is then heated in a furnace, and while hot the ends are flattened and shaped. This old method involves several handlings or separate operations on the wire to produce a handle, and is slow and expensive. By heating the wire, as heretofore, the surface of the wire handle is left rough, and to restore the smoothness it is necessary to "tumble" them. The employment of heat renders it impossible to use wire that is tinned, coppered, or plated; and in order that handles thus made may be finished with tin, copper, or other metal plating, it is necessary, besides "tumbling" the handles, to also pickle them, all of which adds to the expense of production. Another serious objection to the employment of heat in making these handles is that when the handles drop from the forging-die in a hot condition they are often slightly bent or distorted by the fall. A very little bend in a handle will give rise to a misfit when it is sought to apply the bent handle to a vessel wherein rivet-holes suited for a perfect handle have previously been punched. All of these objections are overcome by my method of making the handles without heat.

In order that the invention may be fully understood, reference is made to the accompanying drawings, in which—

Figure 1 shows a straight piece of wire which forms the handle, and which is tinned or plated before it is subjected to the action of the dies. Fig. 2 shows two views of the wire as bent by the first step in the method; and Fig. 3 are two views of the same, showing the final step in the method. Fig. 4 is a front view of the U shaping dies employed in this method, and shows them open to receive the wire. Fig. 5 is a similar view of the U-shaping dies, and shows them closed with the wire between them bent. Fig. 6 is a top view of the U-shaping and end-flattening dies. Fig. 7 is a side view of the dies seen in Fig. 6.

In forming the handles the straight wire $a$ is first bent to a U shape, as seen in Fig. 2, by the action of a pair of dies, and while these dies are still gripping the U-shaped wire another pair of dies produce the curve $b$ and the flat ends $c$, and also impart thereto any desired twist. The part $d$ serves as the hand-grasp.

The two dies E and F impart the U shape to the wire, and the dies G and H curve and flatten the ends, and also give the flat ends a slight twist, as shown in Fig. 3, whereby they will fit properly against the outer side of a circular vessel. The dies E and G are fixed to a suitable bar or shank, I, which is stationary. The die E has a curved face, $d'$, which is provided with a groove, $d^2$, extending in the direction of or with the curve of said face. This curved groove forms the inner curve of the hand-grasp $d$ of the handle. The die G comprises a block with a rounded or outward-curved face corresponding to the segment of a circle. The plane of the curved face of this die G is at a right angle with respect to the plane of the grooved face $d'$ of the die E, and it is on this curved face G that the ends $c$ of the handle are flattened.

Between the dies E and G is an outward-curved shoulder, $b'$, whereon are formed the curves $b$ of the handle, which are adjacent to the flat ends $c$.

The die F is movable and is the counterpart of the stationary die E. The die F has at its top a center concave curve, $d^3$, which forms the outer curved part of the hand-grasp $d$, and at each side of the said center curve is a straight horizontal face provided with a groove, $f$. When the straight piece of wire $a$ is in position above the groove $f$ on top of the movable die F, it will be bent to the U shape by an up movement of said die. When the die F has moved up and the straight wire has thereby been bent to a U shape, the dies E and F continue to hold the bent wire, while the exposed ends of said wire are acted on by other dies, now to be described.

The die H is movable and is the counterpart of the stationary die G—that is to say, it has a concaved face corresponding to the outward-curved face of said die G. The dies G and H act on the exposed ends of the U-shaped wire, which they flatten, as at *c*, and near the flat part curve, as at *b*.

Owing to the concave face of the die H, the contact of the same with the end of the wire causes the latter to slightly roll upon the said face, so as to have a slight twist when flattened by contact with the die G, as seen in Fig. 6 and shown in dotted lines, Fig. 7.

In operating these dies to produce the wire handles having flattened ends no heat is employed. The straight wire *a*, which is already tinned or plated, is placed in the dies E and F, which give it the U shape, and then hold it while the dies G and H flatten the two extremities of the U-bent wire and slightly twist said parts and produce the curve *b* near the flat ends.

By first tinning the wire before subjecting it to the action of the dies several advantages are obtained. The previous tinning makes the wire smooth, which enables the dies to do their work with less friction and wear on the die-surfaces, and, second, the finished article (the wire handle) is cheaper and smoother, for the reason that as the tinning is done while the wire is straight a process of tinning may be employed which permits the wire to be "wiped," whereby the excess of molten tin is stripped off or removed, leaving on the wire only the desired thin coat, and at the same time this same wiping process smooths the tinned surface. Where the tin plating is applied to the wire handles after they are formed an unnecessary quantity of tin will be used, which adds to the cost of the article, and, besides, the surface will be rough.

Having described my invention, I claim and desire to secure by Letters Patent of the United States—

The method of making wire handles of the form and construction herein described and shown—namely, by the use of cold tinned iron wire in contradistinction to heated iron wire untinned, as set forth.

In testimony whereof I affix my signature in the presence of two witnesses.

GEORGE W. KNAPP.

Witnesses:
JOHN E. MORRIS,
JNO. T. MADDOX.